United States Patent [19]

Whightsil, Sr.

[11] Patent Number: 4,593,941

[45] Date of Patent: Jun. 10, 1986

[54] DIVERTER FLEX JOINT

[75] Inventor: Gary L. Whightsil, Sr., Arlington, Tex.

[73] Assignee: LTV Energy Products Company, Houston, Tex.

[21] Appl. No.: 571,304

[22] Filed: Mar. 15, 1984

[51] Int. Cl.$^4$ ............................................. F16L 27/12
[52] U.S. Cl. .................................... 285/165; 285/167; 285/223; 285/263
[58] Field of Search ............... 285/223, 167, 263, 166, 285/165

[56] References Cited

U.S. PATENT DOCUMENTS

| | | | |
|---|---|---|---|
| 918,144 | 4/1909 | Greenlaw | 285/263 |
| 4,068,864 | 1/1978 | Herbert et al. | 285/263 X |
| 4,068,868 | 1/1978 | Ohat | 285/223 X |
| 4,076,284 | 2/1978 | Herbert et al. | 285/263 |
| 4,173,360 | 11/1979 | Bergman | 285/223 X |
| 4,183,556 | 1/1980 | Schwemmer | 285/263 X |
| 4,482,171 | 11/1984 | Campbell | 285/166 X |

FOREIGN PATENT DOCUMENTS

458684  1/1975  U.S.S.R. ............... 285/167

Primary Examiner—Dave W. Arola
Attorney, Agent, or Firm—Arnold, White & Durkee

[57] ABSTRACT

This invention provides for an assembly of elements for conducting fluids where such fluids subject the interior of this assembly to a pressure greater than the pressure exerted on the exterior of the assembly by an ambient fluid. The assembly comprises a plurality of elements connected end-to-end by connecting means and at least one pair of such elements being connected by a flexible connector means. The flexible connector means includes a cylindrical housing that has a greater internal diameter than the external diameter of the elements that it is to connect, and is positioned such that these elements extend inwardly into said housing. A retainer means is employed at each end of the housing and it is adapted for retaining the elements in a fixed position relative to the housing and the flexible connector means. A pair of outer laminated assemblies formed of alternating layers of rigid and flexible material are positioned in the connector to accommodate tensile loads nest of the expected, and a pair of inner laminated assemblies are positioned to accommodate all compression loads and to effect part of the seal between the fluid pathway through the connector and the external environment. A sliding seal element forms the other part of the seal and is also adapted to accommodate the relatively large tensile faces.

22 Claims, 4 Drawing Figures

DIVERTER FLEX JOINT

TECHNICAL FIELD

The present invention relates to a flexible coupling means employed in a column assembly formed from a plurality of individual elements having the capability of accommodating a range of axially directed compression and tension loads and a significant degree of bending forces tending to tilt the column assembly, and more particularly to such a flexible coupling member as used in an offshore drilling assembly for deep sea drilling operations.

BACKGROUND ART

The art relating to flexible couplings is replete with means and methods for accommodating the often dramatic loads that are experienced during deep sea drilling operations. Each newly discovered means or method is generally aimed at improving the capability of the drilling equipment to more efficiently and quickly drill. However, in order to be successful the inventor must inevitably deal with the varying forces in the ocean and at the varying and increasing depths in which drilling operations are now being conducted. The improved equipment must also take into account the weight of the drilling equipment and the inevitable increases in this weight caused by the simple addition of length for the ever increasing depth of drilling operations.

Typically, the off-shore drilling equipment that is used in drilling operations is comprised of a number of specialized elements connected in a long riser column each of which must be designed to act in unison with the entire drilling system. To assemble these elements, there is obviously a need for a number of connector elements of varying design and purpose to connect the system elements and form the drilling riser. One form of these connectors is a flexible connector that is designed to prevent damage to the sensitive system elements that are otherwise unable to withstand the dynamic forces in the ocean environment as they interact with the drilling system. Since it can be assumed that the bottom end of the drilling riser of the drilling assembly is anchored to the ocean floor where drilling is to take place, then the forces that act against the drilling riser are generated both by the ocean and by the movement of the drilling vessel, either a drill ship or an off-shore floating platform. The movement of the drilling vessel, which is normally also anchored in place thereby limiting lateral movement, is generally limited to the rise and fall and oscillating rotation, pitch and yaw caused by ocean swells. The rise and fall of the drilling vessel is largely accommodated in the drilling riser by a telescoping member. Since the differential between the highest to lowest positions of the drilling vessel as caused by such ocean swells can be rather large, the telescoping joint is, of necessity, equally large. Consequently, since any lateral movement of the drilling vessel results in a bending force being applied to the telescoping joint, the larger the telescoping joint the larger the resulting bending force. Of course while the telescoping joint could be engineered to accommodate ever larger bending forces, albeit at significant increased cost, practically speaking, a telescoping joint of the size necessary to accomodate the ocean swells cannot be subjected to significant bending forces since the interfacing members of the joint would tend to gall and seize and cause the drilling operation to shut down for repair. The telescoping joint therefore is one of the sensitive system elements that must be protected from the various forces impinging on the drilling riser.

Typically there are two flexible connectors employed to accommodate the dynamic forces acting against the drilling riser—one at the top of the drilling riser where the riser connects to the drilling vessel, and one at the bottom where the riser is connected to the anchoring means. The upper flexible connector normally attaches to the riser a short distance above the telescoping joint and hence any lateral or rotational movement of the drilling vessel will quickly be transmitted to the connector. Also when the rise and fall of the telescoping joint exceeds its design limits and bottoms or tops out, the resulting compression and tension forces are also quickly transmitted to the upper flexible connector. In addition to these compression and tension loads, the upper flexible connector also needs to be able to accommodate the weight of the drilling riser. The tension load generated by the drilling riser is a static load due to its total weight which load is normally balanced by tensioning devices that attach between the drilling vessel and the bottom of the telescoping joint. However when the drilling operation is to be moved or when the drilling riser or a part thereof needs to be repaired, the upper flexible connector needs to be capable of handling and supporting the weight of the drilling riser which, at varying depths down to the 10,000 ft level can reach eight hundred thousand pounds (800,000 lbs) or more.

The bottommost flexible connector by contrast needs to be designed to accomodate the large tension force that is applied to counterbalance the weight of the drilling riser when it is installed and the fairly constant, and relatively large axially directed tension forces that act along the riser. The bottom flexible connector also needs to accommodate the bending forces acting against the drilling riser, albeit at a relatively larger scale than those acting near the top.

One flexible coupling means designed for accommodating such forces is that shown in U.S. Pat. No. 4,076,284 issued in Feb. 1978 to J. T. Herbert, et al entitled "Ocean Floor Riser Connection". While the original intent of this particular flexible device was to accommodate the flex that occurs between the relatively fixed and anchored well pipe and the drilling riser, the same principles could also be used to design a flexible coupling accommodating the forces that apply against the riser near the top, or between the telescoping joint and the off-shore drilling platform. Herbert et al shows a connector comprising a housing 10 attached by flange 12 to the lower portion of the drilling riser and having a lower bore 10a that is smaller than an upper bore 10d, a nipple 20 attached to the upper portion of the drilling riser by flange 22 and which extends into housing 10 having a flared pattern 20c, an elastomeric seal 30 that is bonded to portion 20c and a collar 31 that engages seal 30 and that is held in place by retainer ring 32. The flex connector is capable of handling tilt of the upper riser 25 relative to housing 10 but apparently Herbert et al assumed that the connector would need to accommodate only relatively large tilting forces since the dimension of zone 10g is indicated as changing very little during such tilting. The Herbert et al connector is also able to remain sealed under both tensile and compresive loads: under tensile load nipple portion 20c acts against seal 30 to maintain the seal, and under compression (here assumed to be a higher external pressure) collar 31 acts against seal 30 to maintain the seal. The inventive aspect of Herbert et al, however, is the use of a guide ring structure for supporting the riser in the housing which guide ring is highly perforate to accommodate scouring of particulate matter that might otherwise lodge between seal 30 and the housing.

Another flexible coupling means designed to accomodate such forces is that described in U.S. Pat. No. 4,068,864 issued to J. T. Herbert et al for a Single Element Flexible Connection. The device described in Herbert '864 comprises a housing 10 a nipple 12 disposed within said housing 10 and having a flared end 12b extending radially outwardly such that it is positioned between the interior wall of cylindrical extension 10c of housing 10 and an interiorly disposed lip 10d. Between lip 10d and the interior wall of 12b there is an inner rubber boddy 20, and between the exterior wall of end 12b and a ring 10f affixed to extension 10c is a flexible elastomeric body 21. Bodies 20 and 21 are provided to accommodate the various faces impinging on connector 10. When the riser, not shown is subjected to tension that face is transmitted to body 21 in compression via flared end 12b. Likewise compression faces are accommodated by body 20. Finally a series of channels 30 are provided in housing 10 to allow pressure equalization into annular wall 10w and to apply internal pipe pressure to body 21.

Both Herbert et al '284 and Herbert et al '864 are capable therefore of handling the various forces that are typically experienced in a drilling riser. However, these designs may not simultaneously be able to accommodate the need for protecting the telescoping joint which is vulnerable to large bending/tilting forces. A flexible connector designed to protect the telescoping joint needs to be capable of tilting under relatively low bending forces. In order to tilt under low bending forces the flexible connector cannot accommodate relatively large tension/compression forces.

A designer might improve the inherent ability of the above-described Herbert et al patents by employing two such connectors arranged in mirror-image relation. This arrangement would enable the designer to accommodate the same axially-directed loads and, since the axially-directed load could be distributed between two connectors in effect, reduce the force required to bend or tilt the double connector by half. U.S. Pat. No. 4,068,868 issued to J. H. Ohrt for a "Flexible Joints for Marine Risers" describes such an arrangement. In Ohrt, joint 10 is connected to the upper riser 11 with flange 15 of upper body 13, and to lower riser 12 by flange 45 of lower body 31. The upper and lower bodies 13, 31 are mirror images of each other each comprising a radially outwardly directed shoulder on which bearing assemblies 47 and 48 are positioned. Bearings 47 and 48 are held in position by bushings 25 and 30 which are attached to housing 28. All tensile forces imposed on the drilling riser column are transmitted to bearings 47 and 48 through the shoulders of bodies 13 and 31. Disposed between bodies 13 and 31 is a seal assembly 50 that prevents leakage from the interior to the exterior of the connector. It is a primary requirement of these flexible connectors to prevent leakage of the highly pressurized drilling mud traversing the riser column. Assembly 50 includes intermediate body 51 and an upper lower seal structure 52 and 54. The seal structures 52 and 54 and bearings 47 and 48 are all similar in construction. They each are laminated structures and include alternating layers of rigid segments and elastomeric segments that are substantially spherical in shape to enable the structures to withstand a greater angular tilt or displacement. However, the laminated structure makes the bearings and seals somewhat vulnerable to tensile forces directed normal to their surface. Ohrt, therefore, requires the bearings and seals to be pre-compressed in order to protect the structures from such potentially damaging tensile loads. The amount of precompression required will depend on the range of forces that are to be accommodated in a particular application. For example, when tensile loads are to be accommodated, bearings 47 and 48 will be precompressed sufficiently to accommodate the desired range of tensile forces and avoid any tensile force being applied against seals 57 and 54.

U.S. Pat. No. 4,173,360 issued to L. A. Bergman for a "Flexible Sealing Joint" is very similar to Ohrt's flexible connector. Bergman includes the concept of two bearings 48a and 48b positioned between flanges (shoulders) 46a and 46b of upper and lower members 44a and 44b and annular flanges (retainers) 40a and 40b. Flanges 40a and 40b are affixed to housing body 38. An intermediate section for sealing between upper and lower members 44a and 44b includes a central element 60, two rigid rings 58a and 58b and flexible elements 62a and 62b disposed therebetween. These several seal and/or bearing structures are similarly subjected to a predetermined level of precompression. The unique aspect of Bergman is that the substantially spherical laminated structure is used only for the bearing elements 48a and 48b (those required to accommodate a load) and that the alternating layers of rigid and then flexible segments are not uniform in thickness but are tapered such that the thicker edges of the several segments are adjacent to the high pressure side of the connector's wall.

The limitations of Ohrt and Berman, described above, are not as great as with the Herbert et al patents in that they can accommodate a larger range of tensile/compression forces and still provide for a relatively low tilting force. However, both Ohrt and Bergman have an inherent limitation in that they must be designed with a specific range of forces that they are to accommodate and generally, as the desired range increases, the bearing structure will be stiffer and therefore the tilting force will likewise be greater. As such, none of the above-described connectors are capable of accommodating the forces that need to be accommodated by the upper flexible connector and at the same time provide significant protection to the telescoping joint. However since they each are readily adaptable to a given range of forces acting on the flexible connector they are perfectly adapted to accommodate the needs of the bottom flexible connector.

Therefore it is an object of the present invention to provide a flexible connector means that is capable of accommodating the various forces that are acting on the upper flexible connector position of a drilling riser.

It is a further object of the present invention to devise a flexible connector means that will provide significant protection to the telescoping joint against damage by bending forces impinging on a drilling riser.

It is a further object of the present invention to provide a flexible connector means that is capable of accommodating two discretely different load ranges.

BRIEF DESCRIPTION OF THE DRAWINGS

Further objects and advantages of the invention will become apparent from the following description and claims, and from the accompanying drawings, wherein:

SUMMARY OF THE INVENTION

This invention provides for a riser assembly for conducting fluids comprising a plurality of riser elements that are connected by a connecting means where at least one pair of these riser elements are connected by a flexible connector. The flexible connector includes a cylindrical housing that has an internal diameter that is greater than the external diameter of the riser elements. The riser elements adjacent to the housing each have at one end a flange for connecting to the connecting means, and at the other end a shoulder means for engaging with the flexible connector and a first interface element. A retainer means is provided at each end of the housing and it is adapted for retaining the adjacent riser elements in a fixed position relative to the housing. The connector also includes a first pair of flexible elements disposed between the shoulder means and the retainer means, and a sealing assembly disposed between the first interface elements of the pair of adjacent riser elements. The sealing assembly includes an intermediate element, a pair of second interface elements and a second pair of flexible elements disposed between and sealingly engaged with the intermediate element and the interface elements; and the interface elements are adapted for engaging a sliding seal means disposed between the first interface elements and the second interface elements. The result is the relatively small tension forces are transmitted through the shoulder means to the first flexible elements as compression forces, relatively large tension forces are transmitted through the first interface elements to the sliding seal means and compression forces are transmitted through the first and the second interface elements to the second flexible elements.

DETAILED DESCRIPTION OF THE INVENTION

Figure 1:
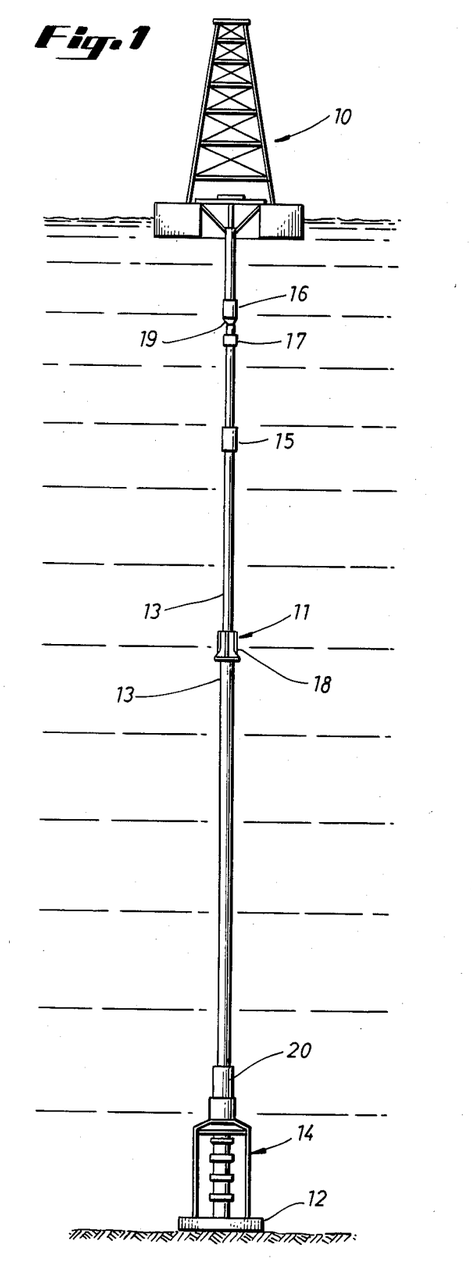
Figure 1 is a front elevational view, of a view of a drilling system sharing the relationship of the present invention flexible connector to the drilling system which is an exemplary application.

Referring now to the drawings in detail, wherein like numerals indicate like elements throughout the several views, the present invention is shown in one embodiment although there are a number of other potential embodiments. In FIG. 1 there is shown an off-shore drilling rig 10 having a drilling riser assembly 11, anchored to the ocean floor at the base 12 of the riser assembly 11. Drilling string assembly 11 includes a variety of sub-system elements including a marine riser system 13, which includes all of assembly 11 above a lower flexible connector 20 and below a telescoping joint assembly 15, a blow-out preventor 14 below flexible connector 20, and a flexible connecter 17 with its associated fluid diverter assembly 16 positioned above telescoping joint 15. Telescoping joint 15 is adapted at its top to engage with a pipe extension from flexible connecter 17. Also, marine riser section 13 is comprised of individual riser sections 19 that are connected into the larger riser assembly 11 by a variety of connectors 18. Riser assembly 11 is in turn connected to lower flexible connector 20.

The critical points of riser assembly 11 with respect to structural integrity are at the top and bottom where the flexible connector assemblies 17 and 20, respectively, are located. These flexible connector assemblies 17, 20 are designed to accommodate the fluid dynamics of the ocean or sea in which the drilling system is operating. However, while these assemblies, 17 and 20, are both referred to as flexible joints, it is important to recognize that each of these flexible connectors, despite certain similarities in appearance and certain commonality in specification and requirement due to the flow dynamics to be experienced, is unique. The application differences, i.e. the application near the ocean floor versus nearer the ocean surface, result in very specific differences in the design of the two flexible connectors. For example, lower flexible connector 20 is required to accommodate the fluid pressures occurring due to the depth of operation and there is a need to accommodate the forces tending to tilt marine riser 13 or move the drilling rig or vessel off-station which in turn adds to the forces that tend to tilt riser 11. There is also a need to accommodate the constant tension loads of high magnitude, due both to the ocean swell and the tensioning that is applied to riser system 11 is to keep drilling system 11 from collapsing. On the other hand, since the initial set up of drilling system 11 includes a certain amount of preload tension sufficient to insure that system 11 is always under tension, this lower flexible connector 20 is, by design, not required to accommodate compression loads.

The upper flexible connector, by contrast, is positioned near the top of riser system 11 just above telescopic joint 15. Upper flexible connector 17 will also be required to accommodate tension load, albeit an extremely high tension load in those fairly infrequent instances where the drilling operator uncouples riser system 11 and blow-out preventer 14 from base 12 to either repair or move drilling assembly 11. In these instances the entire weight of drilling assembly 11 below telescopic joint 15 would need to be accommodated by the upper flexible connector, a weight that is in the range of 500,000 to 800,000 pounds. Finally since the upper flexible connector is so close to telescopic joint 15 the force required to tilt the upper flexible connector 17 must be significantly lower than the force required to tilt lower flexible connector 20. Since a relatively high resistivity to tilting in the upper flexible connector would cause the elements of the telescopic joint to contact causing galling and severe wear or seizure of the elements of telescopic joint 15, upper flexible connector 17 should be designed to tilt at a very low force relative to that at which the tilting would occur at the bottom flexible connector, a difference in magnitude in the range of about 10 to 1.

Figure 2:
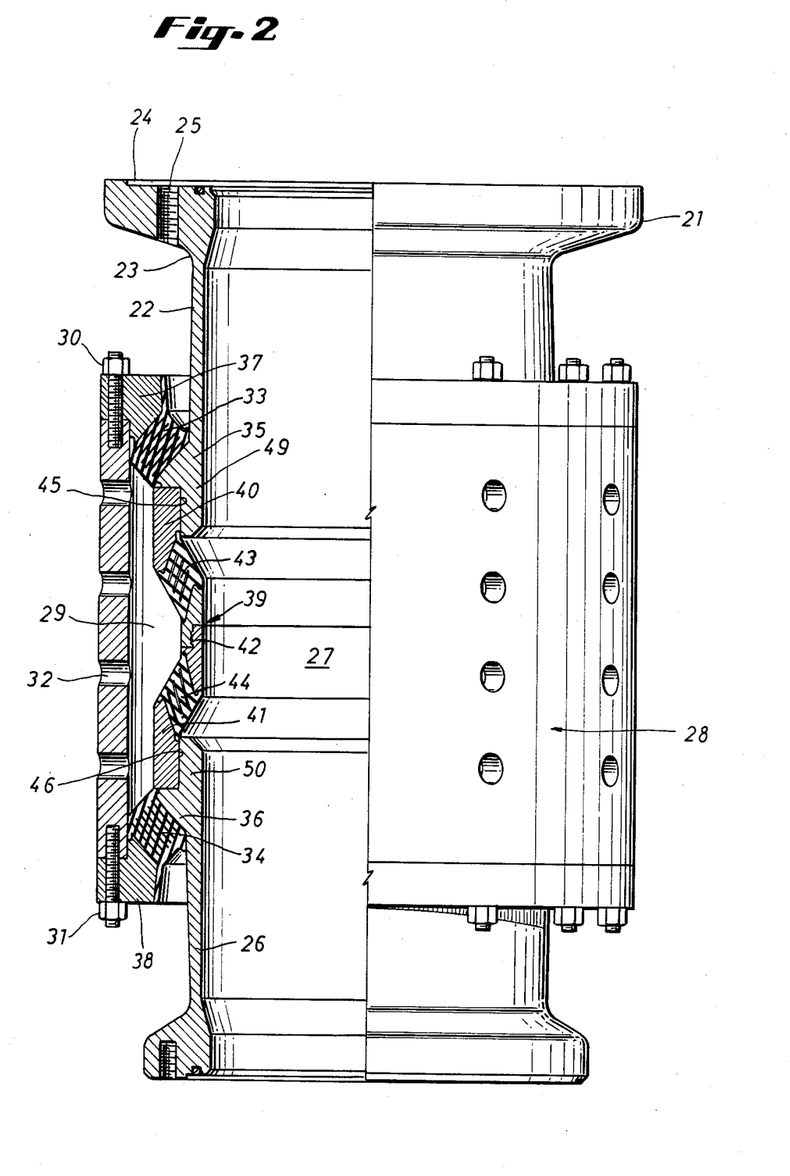
FIG. 2 is a front elevational view, partially broken away, of one embodiment of the present invention in which the flexible connector means is embodied in a connector used for connecting elements of a drilling riser.
Figure 3:
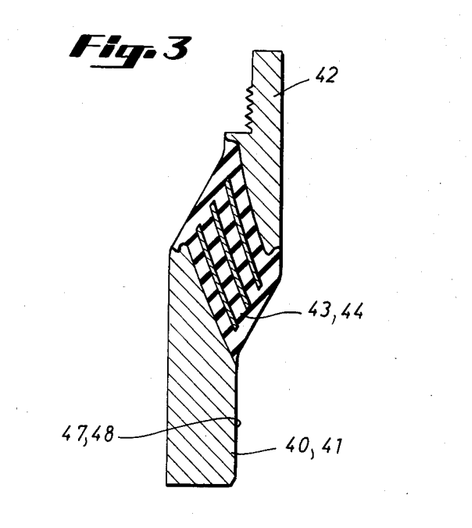
FIG. 3 is an enlarged cross-sectional view of one of the laminated sealing and bearing elements of the present invention.
Figure 4:
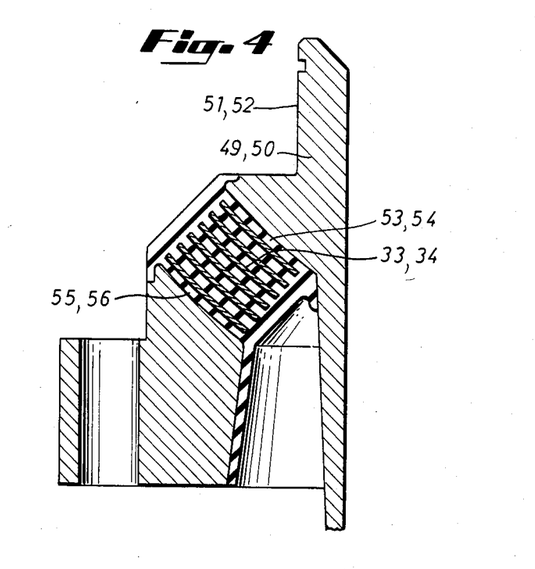
FIG. 4 is an enlarged cross-sectional view of one of the laminated bearing elements of the present invention.

Flex joint 17 is suitably provided with coupling means for diverter assembly 16 at the top and for telescopic joint 15 at the bottom. Referring in more detail to FIG. 2, as shown, the upper section of flexible connector 17 has a flange element 21 for connecting to a mating flange element at the base of diverter assembly 16. In the particular embodiment shown, flange element 21 is but one of a variety of acceptable flange means. In addition, this embodiment shows a preferred means for attaching this flange end to flexible connector 17, i.e., to weld flange 21 to upper body 22 at point 23. Flange 21 could also be provided with a recessed area 24 to provide for a sealing means therebetween, and provision is made in the embodiment at 25 for a threaded connection between upper body 22 and fluid diverter assembly 16. Other known forms of connection for flange ends, such as clamps or other coupling means, could also have been employed. The seal means is employed where it is necessary to prevent loss of a transported fluid, such as drilling mud fluids which are moved through the riser column during operation. There are a number of alternative methods for effecting this seal.

Upper body 22 of flexible connector 17 extends downwardly and is a mirror image of lower body 26, both of which are positioned to protrude inside housing 28. A central area 27 is left between the upper and lower bodies 22 and 26, and this area 27 is encompassed by housing 28. Upper body 22 and lower body 26 each includes a protusion or shoulder 35 and 36, respectively, that extends radially outwardly and that may have an angularly shaped surface as noted below. The surfaces 53, 54, of shoulders 35 and 36, respectively, are aligned to be generally parallel with surfaces 55 and 56 of upper primary retainer 37 and lower primary retainer 38, respectively.

Between surfaces 55 and 56 of the retainers 37 and 38, respectively, and 53 and 54 of shoulders 35 and 36, respectively, are flexible elements 33 and 34. Both elements 33 and 34 are appropriately shaped for engaging retainer surfaces 55, and 56 and shoulder surfaces 53 and 54 and are preferably sealingly engaged herewith either directly as by bonding or vulcanizing, or indirectly where there are metallic interface or wear elements, not shown, between the engaging surfaces of elements 33 and 34 and the appropriate mating surfaces 55 and 56 of retainers 37 and 38, and 53 and 54 of shoulders 35 and 36. These interface or wear elements would, if used, serve to improve the wearability and life of elements 33 and 34 and to facilitate the assembly of flexible connector 17 by enabling the user to bond elements 33 and 34 to these wear elements prior to assembly. The user would therefore only need to bond between two generally similar metallic materials, i.e. interface plates and the mating surfaces of the retainers and shoulders, at assembly rather than between the dissimilar materials of elements 33 and 34, and the engaging surfaces 53, 54 and 55, 56 of shoulders 35, 36 and retainers 37 38. This assembly of flexible elements 33, 34 with retainers 37, 38 and upper body 22 and lower body 26 is secured relative to housing 28 by means of a pattern of bolt or fastener means 30 and 31, respectively. Fasteners 30 and 31 secure upper body 22 and lower body 26, respectively, in a fixed position relative to housing 28.

The design of shoulders 35 and 36 and retainers 37 and 38 where they engage with flexible elements 33 and 34 is such that there engaging surfaces are spherical in shape to facilitate centrally locating these elements relative to bodies 22 and 26 within housing 28 and relative to each other. Edges or stops are also provided as appropriate to such positioning. Elements 33 and 34 or a similar bearings and sealing means located near upper and lower bodies 22, 26 are provided to meet the requirement for a significant degree of radial movement, in effect a freedom for tilting motion. This tilting action is required in order to accommodate the sometimes severe bending forces that will impact against drilling riser 11, particularly at or near anchor position 12 or the topmost position where drilling riser 11 connects to the drilling vessel. To provide support surfaces for flexible elements 33 and 34, flexible connector 17 includes a substantial difference in diameter between the outside diameter of upper and lower body members 22, 26 and the inner diameter of housing 28. The diameter differential allows room for flex or tilting to occur in all directions and the flexible connector design needs to include enough differential to accommodates forces of either a random or a more regular pattern and of significant magnitude.

In addition to the requirement for tilting between housing 28 and upper and lower body members 22 and 26, there is also a requirement that flexible connector 17 be sealed against leakage to prevent the loss of drilling mud, particularly from area 27, into the annular area 29 and, effectively, the external environment. Since the ambient fluid can be introduced into annular area 29 via channels or ports 32 in housing 28, the seal means in the present invention to seal off area 27 is in the form of an intermediate bearing and seal assembly 39 that is adapted to bridge the space between upper and lower body members 22 and 26. This intermediate bearing and seal assembly 39 could be a relatively simple structural member comprising a simple elastomeric device for accommodating the tilting requirements of upper and lower body members 22, and 26 and for sealing between these members, or alternatively assembly 39 could include a relatively sophisticated flexible assembly design. The distinction is one of application and the forces that are to be accommodated in that application. The drilling mud that is being conducted through the interior pathway of the flexible connector is highly pressurized and therefore will exert a significant force against the interior portions of any seal spaced between upper and lower body members 22 and 26. The sea water external to flexible connector 17 exerts a pressure against the the exterior portion of such a seal but less than the drilling mud pressure, and the resulting differential pressure must be accommodated in any seal design. Due to the difference in the specific gravity of the drilling mud and the sea water, the differential pressure increases as the depth at which drilling occurs increases. Hence a relatively deep drilling operation will, perforce, require that significantly greater forces be accommodated by a seal assembly 39 for a lower flexible connector than a similar seal for an upper flexible connector. Therefore the design of a lower flexible connector must resort to a sophisticated bearing and seal design assembly in order to keep the connector size within reason, whereas the upper flexible connector could normally accommodate the differential pressure with a relatively simple elastomeric seal device. However where there is a need to accommodate axially directed tensile and compressive forces and a need to accommodate either misalignment or tilting forces, i.e. bending forces, the ususal design is to include a pair of laminated flexible elements that, acting in unison, ensure that the required seal is maintained. In any case, such a laminated bearing device having alternating layers of rigid and then flexible segments is more versatile than the simple device. Since such laminated bearings can accommodate a relatively large range of compression forces but only a limited amount of tension forces, to accommodate a greater range of forces four bearing elements could be employed to act in unison: one set for compression forces and another set for tension forces. For example, each of the flexible elements 33 and 34 could act in unison with a pair of bearing assemblies 43 and 44, respectively, as shown in FIG. 2. Assemblies 33, 34, 43 and 44 would each be subjected to a pre-determined level of precompression that could enable flexible connector 17 to handle the required range of tensile, compression or any combination of such forces without ever bottoming out, i.e. allowing a given bearing to be subjected to a force sufficient to eliminate its precompression. If there were a range of tensile forces to be accommodated then assemblies 33 and 34 would see such forces via shoulders 35 and 36 would be provided with sufficient precompression to accommodate that range of forces and prevent any significant tension force being applied against assemblies 43 and 44 or, in the present assembly to the seals 45 and 46. (Note that the tension would be direct if a positive connection was made between assembly 39 and upper and lower bodies 22, 26.). Similarly if there were a desired range of compression forces to be accommodated then assemblies 33 and 34 would be subject to a precompression sufficient to accommodate those forces and still ensure that upper and lower body members 22 and 26 remained sealed by bearings 43 and 44 and sealing assembly 39.

Theoretically a flexible connector can therefore be designed to accommodate virtually any range of forces. The limitation on such flexible connector is that as the range of forces to be accommodated increases the assemblies must become more rigid in order to act to ensure the seal at area 27. However, as noted previously, upper flexible connector 17 must be designed to also minimize damage to the telescoping joint 12. Telescopic joint 15 is most vulnerable to damage when riser assembly 11 is bent or tilted unless flexible connector 17 is able to accommodate the deflection by tilting internally and thereby keeping telescoping joint 15 from seeing such tilting forces. If the bearing assemblies 33, 34, 43 and 44 in flexible connector 17 are too rigid then the force required to tilt the flexible connector would be relatively large and telescopic joint 15 either must be able to accommodate that force or it will be subject to damage. The trade-off therefore in the design of an upper flexible connector is between the need for bearing assemblies rigid enough to accommodate the expected range of tension and compression forces, and the need to minimize the force required to tilt the flexible connector and prevent damage to telescoping joint 15. Since upper flexible connector 17 is normally expected to see only relatively low, regularly occurring tensile or compressive forces, flexible connector 17 can be designed to tilt at a fairly low force level. However, upper flexible connector 17 must also be able to accommodate the irregularly occurring and relatively large tensile force that is caused by the weight of riser assembly 11. This large tensile force occurs, as noted, whenever riser assembly 11 is removed from the drilling line for repair or moved to a new location of drilling. When riser assembly 11 is thus removed the weight of the entire column is applied against telescopic joint 15 first and, when it bottoms out, to flexible connector 17. If the bearing assemblies are not sufficiently rigid to withstand this large tensile force then the seal between upper and lower body members 22 and 26 will be broken. Since the assemblies cannot be designed to be both sufficiently rigid to handle this relatively large tensile force and at the same time provide for a relatively low tilting force, upper flexible connector 17 of the present invention has included a sliding seal device 45 to work in unison with bearing assemblies 33, 34, 43 and 44 to ensure the seal in area 27. Additionally, bearing assemblies 33, 34, 43 and 44 in the present invention are disposed at a pre-determined angle and are spherical in shape. The generally spherical shape of the bearing assemblies enables the bearings to better accommodate the tilting action of upper and lower bodies 22 and 26 relative to each other and in all directions such that it acts as a universal joint. In the present invention the outer bearing assemblies 33 and 34 are designed to handle the tension load requirements axially exerted along riser assembly 11. Such tensile loads exert a compressive load on assemblies 33 and 34 through shoulders 35 and 36, and therefore tend to draw assemblies 33 and 34 outwardly away from inner bearing and sealing assemblies 43 and 44. The lower most edges 49 and 50 of body members 22 and 26 which interface with the interface elements 40 and 41 of intermediate assembly 39 will also be tending to separate and break the seal. While the interface could have been in the form of a positive engagement means such as a threaded connector, thereby allowing the tensile forces to be accommodated in part by assemblies 43 and 44, the requirement for accommodating, in effect, two distinct ranges of tensile forces resulted in adapting these interfaces to the sliding seal means 45 and 46. Bearing assemblies 43 and 44 positioned in intermediate body member 39 are designed to accommodate any compressive forces that are exerted axially along riser assembly 11 and through shoulders 35 and 36. Since there is normally expected to be regularly occurring compressive and tensile forces acting axially along riser assembly 11, bearing members 33, 34, 43 and 44 are each sufficiently precompressed to accommodate such forces. In the present invention, as shown in FIG. 2, there is shown one preferred embodiment of the intermediate structure 39 including an upper and lower interface element 40 and 41, bearing assemblies 43 and 44, and an intermediate body member 42 disposed therebetween. The interior-most surfaces of interface elements 40 and 41 and the adjacent surfaces of intermediate body 42 are sealingly attached or bonded to the adjacent surfaces of bearing elements 43 and 44 when these elements are combined to form intermediate assembly 39.

The assembly of flexible connector 17 begins by assembling lower body 26 into housing 28, positioning bearing 34 with screws 31 into housing 28 and thereby capturing bearing 34 against shoulder 36, placing lower retainer 38 onto bearing 34 and affixing retainer 38 to housing 28 by some conventional fastening means, as for example bolts 31. Interface element 41 of intermediate bearing and seal member 39 is then positioned relative to interface element 50 of lower body member 26 so as to effect sliding seal 46 between interface surfaces 41 and 50. Next, interface element 49 of upper body 27 is positioned relative to interface element 40 to effect sliding seal 45 between interface surfaces 40 and 49. Finally, bearing element 33 is positioned against shoulder 35, and upper retainer 37 is placed on top of bearing 33. Obviously, if there is to be a certain amount of precompression in each of the several bearing elements 33, 34, 43 and 44, upper body 22 along with retainer 37 holding bearing element 33 between itself and shoulder 35 of upper body 22 will stand some distance above the point where retainer 37 is to engage and bolt to housing 28. The assemblage is therefore completed by properly tightening these parts into place by applying sufficient torque in a predetermined pattern that is designed to provide a uniform distribution of precompression to the several bearings elements along the entire surface of each of the bearing assemblies.

Having described the requirements of the design for an upper flexible connector and its general assembly, it should be clear that it is impractical to design an upper flexible connector that is both capable of accommodating the different bending forces and the expected range of compression or tension forces, and at the same time provide adequate protection to telescoping joint 15. In recognizing this problem, it is assumed that a design for a specific flexible connector is limited to a given range of forces as opposed to several discreet ranges of forces (e.g. one high range and one low range). It should also be recognized that the general principles involved in designing a flexible connector capable of accommodating relatively high forces are equally applicable to the design of a flexible connector adapted for accommodating relatively low forces. In addition, a fairly simple bearing assembly comprised of a single bearing material such as a rubber bearing cannot accommodate as great a range of forces as, for example, a laminated bearing comprised of alternating layers of rigid segments and flexible segments. Therefore, the more effective design for a bearing assembly having a capability of accommodating a fairly large range of forces, either bending forces or axially directed forces (compression, tension) is one fabricated to comprise multiple layers with alternating layers of a rigid element of uniform thickness, such as a steel, a hard fabric or other metallic material, and flexible material of uniform thickness, such as a natural or synthetic rubber. The use of alternating layers in the housing designed is intended to improve the strength of a bearing assembly when it experiences forces in a plane normal to the alternating layers. However, since the bearing assembly for flexible connector 17 must also be able to accommodate a certain amount of flexure or tilting, and since the rigid layers tend to reduce the bearing's overall flexibility the total thickness of rigid layers will tend to be smaller relative to the total thickness of elastomeric layers in direct proportion to the degree of flexure desired in a particular application.

In the specific embodiment of the present invention, the bearing assemblies are also disposed in a particular direction so as to best accommodate the expected range of forces and the angle of incidence of these forces. The specific disposition of the bearings is dependent on the fact that a bearing assembly designed with alternating layers of dissimilar materials is vulnerable to damage when the angle of incidence of forces that are directed against the assembly is along a path parallel to these alternating layers (as well as being vulnerable to tensile forces acting normal to the surface of the bearing). For best effect, therefore, the bearing are disposed at an angle and disposed between elements, i.e., the shoulder and the retainer, such that the angle of incidence of such forces will not be parallel to the alternating layers but as close to normal to the layers as possible. The assembly of layers is also designed to be substantially spherical in shape in order, as previously noted, to permit the bearings to better accommodate flexure in all directions.

Fairly conventional techniques can be adapted, for bonding bearing assemblies 33, 34, 43 and 44 to the adjacent flexible connector elements, i.e., retainers 37 and 38 and shoulders 35 and 36 for assemblies 37 and 38 and interface elements 40 and 41 of intermediate element 39 and interface elements 49 and 50 of upper and lower bodies 22 and 26 for assemblies 43 and 44. For example, where the outer layer of a given bearing assembly is one of the flexible materials, such as a rubber, then a vulcanizing process can be used. Alternatively, should the outer layers be one of the more rigid materials then a suitable bonding technique using an adhesive or similar material can be used. In the preferred embodiment of the present invention there is no need to provide a positive bonding, and effectively a seal, between bearing assemblies 33 and 34 and the respective retainers 37 and 38 and shoulders 35 and 36. However bearing assemblies 43 and 44 must be sealingly affixed to the respective surfaces of intermediate element 42 and interface elements 40 and 41.

As noted above, the critical design aspect of the subject flexible connector is the seal in area 27 which is effected by the interface points between intermediate assembly 39 and upper and lower body members 22 and 26. As shown in FIG. 2, a sealing means 45 and 46 are disposed between surfaces 47 and 48 of interface members 40 and 41 and the adjacent surfaces of interface extensions 49 and 50 of upper and lower body members 22 and 26, respectively. These seal means 45, 46 are designed to prevent leakage from the interior pathway through the riser column to annular space 29. The present invention also makes use of the concept that it is often preferable to separate the main bearing assembly, e.g., assemblies 33 and 34, from the sealing means, e.g., assemblies 43 and 44. This concept then allows the designer to design a seal that will not be subjected to wear and degradation from load forces. However, to provide for both compressive and tensile loads it is preferable to separate these different types of loads particularly where the bearing design is a laminated assembly. Hence the less frequently occurring type of load, compression loads, is accomodated by the sealing flexible member, and therefore assemblies 43 and 44 are both sealing and bearing elements. In order to accomodate two distinct ranges of tension forces the designer can either design the bearings to accommodate a range sufficient to encompass both or provide an alternative bearing means for one of the ranges. The former alternative would also increase the force required to tilt the connector and potentially damage telescoping joint 15. The design of the present invention therefore incorporates the sliding seal means 45, 46 that allows the designer to effectively bridge the gap between two distinct ranges of forces. These seals 45, 46 are generally conventional sliding seals. However, sliding seals are normally subject to rapid wear and failure where such a seal is in frequent contact with a moving surface against which it seals. To minimize such deterioration particularly where there is a requirement for the seal to survive for long periods to avoid the extremely high cost of repair due to the disassembly of riser assembly 11, the design of bearings 33, 34, 43 and 44 and the amount of precompression designed into these bearing assemblies should be sufficient to *normally* prevent movement between interface elements 40, 41 and 49, 50 and thereby minimize the potential for wearing contact of sliding seals 45 and 46. The forces that are normally expected to be accommodated by upper flexible connector 17 in the deep sea drilling environment include an infrequent, relatively large tensile load due to disassembly of the riser column for either repair or for a change in drilling site; and the regular, frequently occurring tilting and low level compression and tension loads. Hence the present inventer bearing assemblies 33, 34, 43 and 44 are designed for a load range over which the large bulk of the expected loads can easily be accommodated including the trade-off to minimize the vulnerability of telescopic joint 15 to tilting forces, and the larger tensile load, required to support in static load the entire riser assembly 11, can be accommodated through the sliding seal. The sliding seal, as provided at 45 and 46, is therefore of prime significance in distinguishing the flexible connector of the present invention over a flexible connector of a similar nature and particularly one that is designed to accommodate only the range of forces expected to act on the bottom flexible connector position in a riser assembly.

One final consideration in the design of a specific flexible connector is that in designing such a flexible connector, either an upper flexible connector or a lower flexible connector, for a particular customer or a specific service application, the designer is usually asked to fit his design within a specific space envelope. In addition, the American Petroleum Institute (API) defines certain parameters such as the casing diameter, the allowable wall thickness, and the allowable materials and the strain range of the selected material of construction; and a variety of other regulating bodies, such as the (National Association of Corrosion Engineers) NACE, also suggest the specific grades of steel that should be employed in specific environments.

In any event, after accommodating the physical dimensions that are either specifically regulated or customer required, the designer must adapt the bearing and seal designs to a rather small and precisely located area. Consequently, the most important elements in the design are the bearing and sealing assemblies.

In addition to the previously mentioned design aspects that enter into the design of the bearings of the present invention, the bearings also should be positioned in the flexible connector so as to optimize the bearing capability of these laminated bearings. The optimum position for the bearing is such that its mean angle, i.e. the line of optimum performance, is at some specified angle from vertical (or axial). The optimum angle is such that a line when drawn through the mean angle of the bearing also passes through the center of rotation when the bearing is under load. Since the loads to be experienced by the bearing have varying angles of incidence, practically speaking it is virtually impossible to design to a precise optimum. However, the designer can define the mean angles so as to take into account as completely as possible all loads that are to be accommodated by the bearing, select an averaged angle and then mathematically verify the lines of action relative to the center of rotation and the change to these lines of action under loading of the bearing. These lines of action under loading are directly affected by the material of construction of the bearing as well as the size and thickness of the several elements.

The verification of a selected angle is a complex mathematical analysis and is preferrably handled by a computer program that can manipulate the several variables and the multiple iterations of such variables to produce the best possible averaged mean angle. Frequently the complexity of the mathematics may require several computer programs of increasing sophistication in order to more readily manipulate the several variables. In fact, for the design of the present invention, the inventor initially employed proprietary computer modeling programs to simply determine the general tendency of a given design selection of variables to meet the optimum designs and arrive at a more manageable number of choices for the optimum mean angle relative to a given set of design variables. Thereafter he employed a proprietary finite element analysis program to more precisely define an acceptable group of design variables that produce the best mean angle results under loading.

The above-described flexible element is but one embodiment where the principles of the bearing design could be applied for accommodating a range of forces. Various improvements, modifications and alternative applications and uses will be readily apparent to those of ordinary skill in the art. Accordingly, the scope of the present invention should be considered in terms of the following claims and it is not to be limited to the details of the embodiment and its structure and operation, shown in the specification and drawings.

I claim:

1. A riser assembly for conducting fluids comprising:
   (a) a plurality of riser elements being connected by connecting means;
   (b) at least one pair of said riser elements being connected by a flexible connector;
   (c) said riser elements each adjacent to a generally cylindrical housing, each having at one end a flange for connecting to said connecting means, and at the other end a shoulder means for engaging with said flexible connector, and a first interface element;
   (d) said flexible connector including said housing having an internal diameter that is greater than the external diameter of said riser elements, a retainer means at each end of said housing adapted for retaining said adjacent riser elements in a fixed position relative to said housing, a first pair of flexible elements disposed between said shoulder means and said retainer means, a sealing assembly disposed between said first interface elements of said pair of riser elements, said sealingly assembly including an intermediate element, a pair of second interface elements and a second pair of flexible elements disposed between and sealingly engaged with said intermediate element and said second interface elements, and said interface elements being adapted for engaging a sliding seal means disposed between said first interface elements and said second pair of interface elements, whereby relatively small tension forces are transmitted through said shoulder means to said first flexible elements as compression forces, relatively large tension forces are, in addition, transmitted through said first interface elements to said sliding seal means as tension forces, and compression forces are directly transmitted through said first and said second interface elements to said second flexible elements.

2. The riser assembly of claim 1 wherein said first flexible elements are comprised of alternating layers of a relatively flexible layer and a relatively inflexible layer bonded together.

3. The riser assembly of claim 2 wherein said flexible layer is formed from an elastomeric material.

4. The riser assembly of claim 2 wherein said relatively inflexible layer is formed from a metallic material.

5. The riser assembly of claim 1 wherein said shoulder means is disposed at an angle relative to said retaining means.

6. The riser assembly of claim 1 wherein said intermediate element is formed from an upper section and a lower section sealingly engaged together.

7. The riser assembly of claim 1 wherein said second flexible elements are comprised of alternating layers of an elastomeric material layer and an inflexible, metallic material layer.

8. The riser assembly of claim 1 wherein said housing includes a plurality of channels therethrough to allow an external fluid surrounding said flexible connector to enter into an annular area formed between said sealing assembly and said housing.

9. The riser assembly of claim 1 wherein said first flexible element are sealingly engaged with said retainer means and said shoulder.

10. The riser assembly of claim 1 wherein said flexible elements are substantially spherical in shape whereby the flexible connector is able to accommodate a wider range of tilting forces.

11. The riser assembly of claim 1 wherein the said flexible elements are both designed to be load bearing and are positioned such that the load forces act in a direction generally coincident with the mean angle of said flexible element and the center of rotation of said flexible connector.

12. A flexible connector comprising:
    (a) a generally cylindrical housing having an internal diameter that is greater than the external diameter of the elements that it is adapted to connect; each element having shoulder means thereon;
    (b) a retainer means at each end of said housing adapted for retaining said connected elements in a fixed position relative to said housing;
    (c) a first pair of flexible elements disposed between said shoulder means on said connected elements and said retainer means;
    (d) a sealing assembly adapted to sealingly engage said connected elements;
    (e) said sealing assembly including an intermediate element, a pair of interface elements and a second pair of flexible elements disposed between and sealingly engaged with said intermediate element and said interface elements;
    (f) said interface elements being adapted for engaging with said connected elements and to form therebetween a sliding seal means, whereby relatively small tension forces are transmitted through said shoulder means to said first flexible elements as compression forces, relatively large tension forces are, in addition, transmitted through said first interface elements to said sliding seal means as tension forces, and compression forces are directly transmitted through said second interface elements to said second flexible elements.

13. The flexible connector of claim 12 wherein said first flexible elements are comprised of alternating layers of a relatively flexible layer and a relatively inflexible layer bonded together.

14. The flexible connector of claim 13 wherein said flexible layer is formed from an elastomeric material.

15. The riser assembly of claim 13 wherein said relatively inflexible layer is formed from a metallic material.

16. The flexible connector of claim 12 wherein said shoulder means is disposed at an angle relative to said retaining means.

17. The flexible connector of claim 12 wherein said intermediate element is formed from an upper section and a lower section sealingly engaged together.

18. The riser assembly of claim 12 wherein said second flexible elements are comprised of alternating layers of an elastomeric material layer and an inflexible, metallic material layer.

19. The flexible connector of claim 12 wherein said housing includes a plurality of channels therethrough to allow an external fluid surrounding said flexible connector to enter into an annular area formed between said sealing assembly and said housing.

20. The flexible connector of claim 12 wherein said first flexible element are sealingly engaged with said retainer means and said shoulder.

21. The riser assembly of claim 12 wherein said flexible elements are substantially spherical in shape whereby the flexible connector is able to accommodate a wider range of tilting forces.

22. The flexible connector of claim 12 wherein the said flexible elements are both designed to be load bearing and are positioned such that the load forces acts in a direction generally coincident with the mean angle of said flexible element and the center of rotation of said flexible connector.

* * * * *